June 18, 1946.  C. W. SCHREIBER  2,402,452
APPARATUS FOR BURNING OFF GLASSWARE
Original Filed Nov. 6, 1941  3 Sheets-Sheet 1

C. W. Schreiber
INVENTOR

BY Rule & Hoge
ATTORNEYS

June 18, 1946.   C. W. SCHREIBER   2,402,452
APPARATUS FOR BURNING OFF GLASSWARE
Original Filed Nov. 6, 1941   3 Sheets-Sheet 2
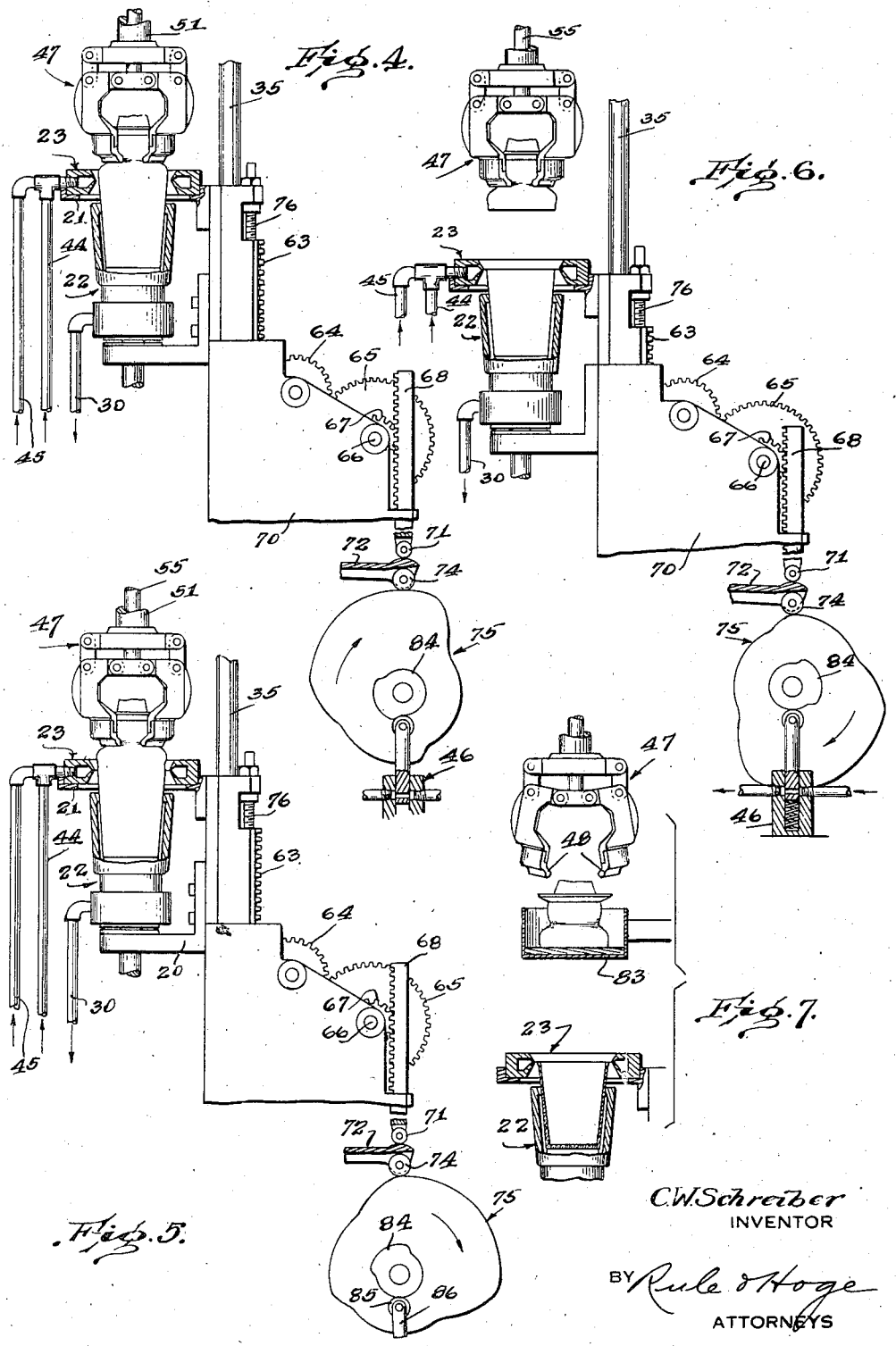
C. W. Schreiber
INVENTOR
BY Rule & Hoge
ATTORNEYS June 18, 1946.      C. W. SCHREIBER      2,402,452
APPARATUS FOR BURNING OFF GLASSWARE
Original Filed Nov. 6, 1941      3 Sheets-Sheet 3

C.W.Schreiber
INVENTOR
BY Rule & Hoge
ATTORNEYS

Patented June 18, 1946

2,402,452

UNITED STATES PATENT OFFICE 2,402,452

APPARATUS FOR BURNING OFF GLASSWARE

Carl W. Schreiber, Toledo, Ohio, assignor, by mesne assignments, to Owens-Illinois Glass Company, Toledo, Ohio, a corporation of Ohio Continuation of application Serial No. 418,036, November 6, 1941. This application December 9, 1944, Serial No. 567,395

7 Claims. (Cl. 49—50)

My invention relates to improvements in methods of and apparatus for burning off glassware and more particularly is concerned with the severance of a moil from an article of glassware and the formation of a bead on the lip, or rim, of the article, which latter may be a tumbler, or similar piece of tableware.

An object of my invention is the provision of novel means whereby a satisfactory commercially acceptable bead may be produced irrespective of any irregularities in the wall thickness of the article. To this end the invention provides for softening of the glass at the line of severance sufficiently to permit the necessary and desired stretching of the glass, prior to any relative axial movement between the moil and article and then by a regulably controlled stretching and burning through of the softened glass, simultaneously and uniformly separating the article and moil at all points of severance. Thus I materially reduce, if not entirely eliminate, any tendency to produce humps or lumps in the bead, such as generally occur where the separation is largely uncontrolled and results from the pull of gravity upon either the article or moil.

The present application is a continuation of my copending application Serial Number 418,036, filed Nov. 6, 1941, entitled Apparatus for burning off glassware.

Other objects will be in part apparent and in part pointed out hereinafter.

In the drawings:

Fig. 4 is a detail sectional elevational view showing the relative positioning of the parts during the step of softening the glass at the intended line of severance.

Fig. 5 is a view similar to Fig. 4, the softened glass having been stretched and nearly completely burned through.

Fig. 6 is a similar view in which the moil has been separated from the article and the latter lowered away from the moil.

Fig. 7 shows the moil in the receiver and the article positioned for the beading operation.

Figures 1, 2, 3:
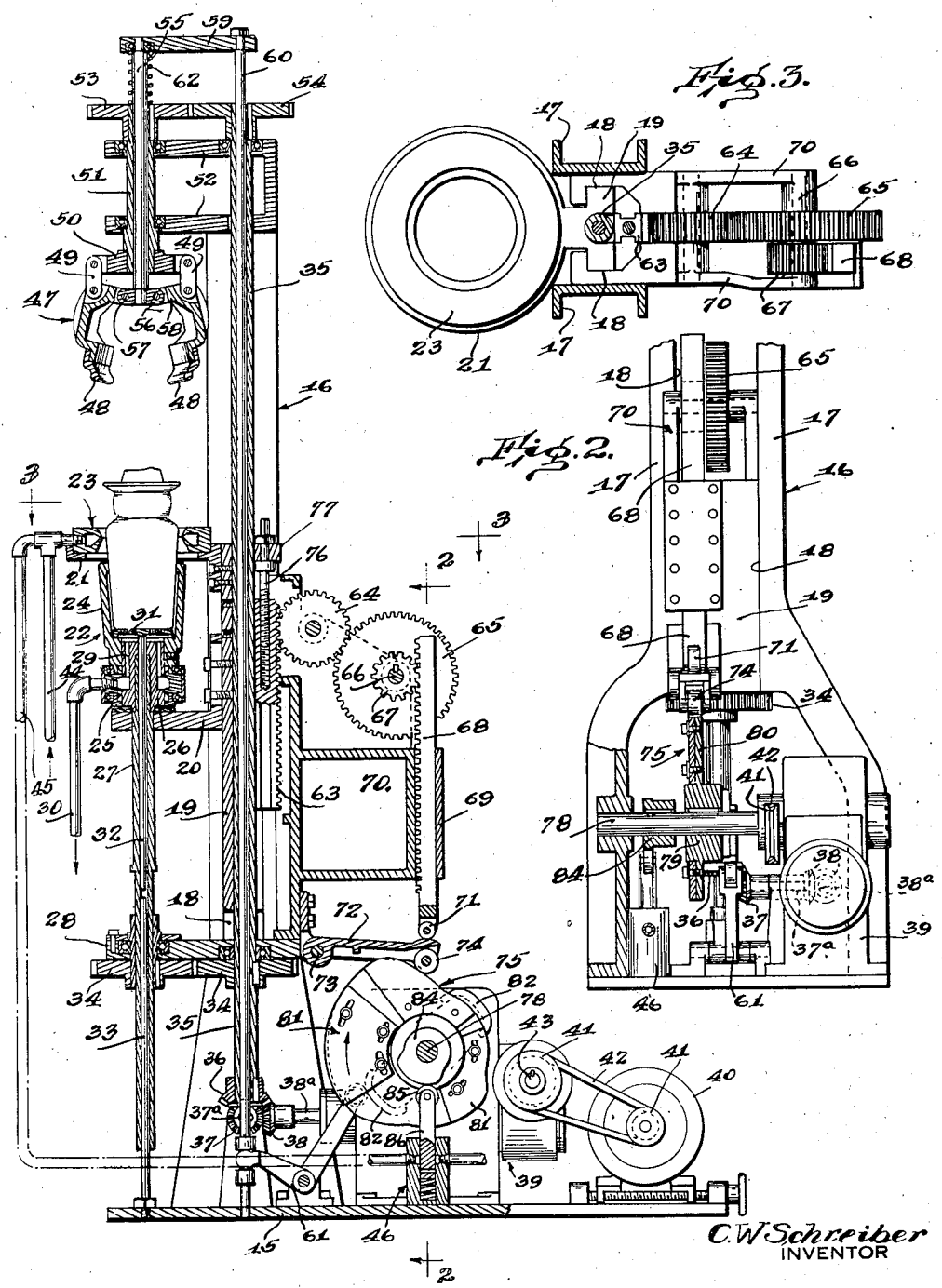
Fig. 1 is a vertical sectional view of an apparatus embodying my invention.
Fig. 2 is a sectional elevational view taken substantially along the line 2—2 of Fig. 1.
Fig. 3 is a sectional plan view taken substantially along the line 3—3 of Fig. 1.

Briefly, my invention comprises a chuck and burner unit, which is designed to support an article of glassware with the moil attached thereto, in a normal upright position, with the burner so placed relative to the chuck, that it will direct an annular flame against the glass at the desired point of severance. This unit is movable vertically to bring the moil into engagement with jaws which grip the moil and firmly hold it during the burning-off operation. Both the chuck which directly receives and holds the article and the jaws which grip the moil, rotate about their common vertical axis to thereby effect relative rotation between the article of glassware and the annular flame. By means of cam controlled mechanism the chuck is held against downward movement during a preliminary glass softening period and immediately thereafter is lowered a predetermined distance for the purpose of stretching the glass which has been softened and finally severing it whereby to completely separate the article and moil. Immediately thereafter, the lip, or rim of the article, is beaded by the continued application of an intensely hot flame to that surface. The moil is removed from the jaws and the finished article is elevated to a position to facilitate removal thereof from the chuck and the placing of another article in the latter preparatory to the burning off of the moil.

The apparatus comprises a base 15 which supports a frame 16 consisting of a pair of spaced uprights 17, the latter including a pair of opposed vertical slideways 18 in which a slide 19 is mounted for vertical reciprocation. This slide includes a forwardly extending horizontal shelf 20 (Fig. 1) and thereabove a bracket 21, which together, support the chuck 22 and burner 23 referred to heretofore.

The chuck 22 (Fig. 1) comprises a cup 24 open at its upper end and provided at its lower end with a bearing 25 whereby the chuck is capable of rotation about its longitudinal vertical axis. This bearing 25 includes a central sleeve 26, connected to a tubular shaft 27 which extends downwardly through said horizontal shelf 20 and a bracket 28, below which it is connected to gears for rotating it, as will be brought out hereinafter. Cored passageways 29 in the sleeve 26 are connected to a vacuum supply pipe 30 whereby to permit the application of vacuum to a perforated bottom plate 31 which due to said application of vacuum, rigidly attaches itself to the adjacent end of the article of glassware being treated. This perforated bottom plate 31 is connected to a push rod 32 which extends downwardly through the tubular shaft 27 and normally terminates at a point in close proximity to the upper end of an ejector rod 33 which in turn extends downwardly through the lower part of said tubular shaft 27 where it is fixed to the base 15, already described.

Rotation of the chuck 22 to impart rotary movement of the article relative to the flame, is obtained through mechanism including a pair of gears 34, one of which is connected to the tubular shaft below the bracket 28, while the other is keyed to a second tubular shaft 35, which extends substantially the entire height of the apparatus and is in part fitted into the vertical slide 19 (Fig. 3). The lower end of this last named tubular shaft carries a bevel gear 36 which meshes with a pinion 37. A horizontal shaft 37ª and pinions 38 connect this pinion 37 and a horizontal shaft 38ª which forms part of a speed reduction gearing 39. An electric motor 40 operates through pulleys 41, a driving belt 42, shaft 43 and said speed reducing unit 39, to drive the shaft 38ª.

The burner unit 23 includes a conventional burner ring resting upon the aforementioned horizontal bracket 21 and axially aligned with the chuck 22. Two fuel lines are connected to the burner ring. One line 44 conducts fuel gas to the burner continuously while the other line 45 conducts oxygen thereto, the latter line being connected to a valve 46 to be described later, which cuts off the supply of oxygen during preselected periods of the cycle of operations of the machine.

The moil gripping unit 47 (Fig. 1) which is positioned above the burner unit 23, comprises a pair of jaws 48 pivoted to links 49 which depend from a head 50 attached to the lower end of a tubular shaft 51. This shaft is journalled in bearings provided in a pair of vertically spaced arms 52 at the upper end of the frame 16 and at its upper end is connected to a gear 53 running in mesh with a second gear 54, the latter being attached to the extreme upper end of the last named tubular shaft 35. Through this arrangement the moil gripping unit is caused to rotate with and at the same speed as the chuck 22.

Opening and closing of the jaws 48 of the moil gripping unit 47 is obtained by mechanism including a push rod 55, which extends downwardly through the tubular shaft 51 and at its lower end, carries a collar 56 which is connected through hinge pins 57 to fingers 58 forming a part of said jaws 48. The upper end of the push rod 55 extends above the plane of the gears 53 and 54 and is connected by means of an arm 59 to an operating rod 60 which extends the entire length of the tubular shaft 35 and at its lower end has operative connection with a bell crank lever 61, the latter being cam operated and functioning to impart axial movement to the operating rod 60, at regular time intervals. A coil spring 62 encircling the push rod 55 between the gear 53 and said arm 59, normally tends to move the push rod vertically upward and thereby hold the jaws 48 closed.

Immediately following positioning of the parts as illustrated in Fig. 1, both the chuck and burner are moved upwardly with the article, to place the moil in a position wherein it may be gripped by the jaws 48. Such upward movement of the chuck and burner as well as later downward movement thereof, involves vertical movement of the slide 19. This is obtained by mechanism including a rack bar 63 on one face of the slide meshing with a pinion 64, the latter being driven by a gear 65 which is mounted upon a horizontal shaft 66. A pinion 67 also carried by this shaft, meshes with a vertical rack bar 68 which is mounted for sliding movement in a guide 69 forming part of a stationary bracket 70 which also supports the aforementioned pinions, gears, and shafts. The lower end of the last named rack bar 68, carries a roller 71 which rides upon the free end of a pivoted horizontal arm 72. This arm is pivoted to a horizontal hinge pin 73 on the last named bracket 70 and at its free end carries a cam roller 74 which constantly rides upon a rotary cam 75, the function and construction of which will become apparent presently. Referring back to the first named vertical rack bar 63 and particularly to Fig. 1, it will be observed that this bar is adjustable vertically on the slide 19 by means of an adjusting screw 76 which is rotatively supported in a bracket 77 provided at the upper end of said slide. By rotating this screw it is clear that the rack bar may be moved vertically relative to the slide and thereby regulably control the operating position of the chuck and burner units. This is of importance and distinctly advantageous in setting the apparatus for the treatment of glassware of different height.

Figure 8:
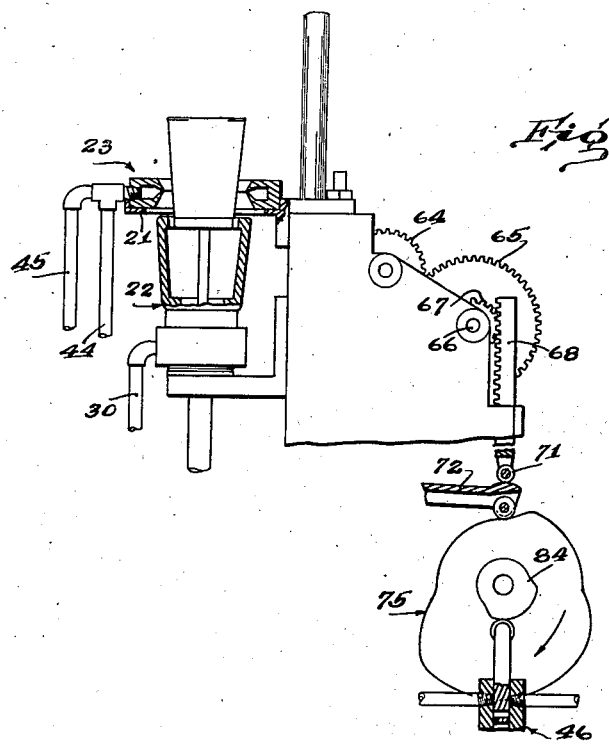
Fig. 8 is a fragmentary side elevational view showing the finished tumber in position to be removed from the apparatus.
Figure 9:
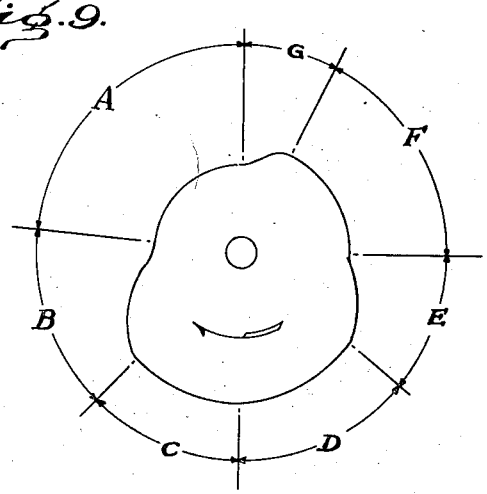
Fig. 9 is a view of the main control cam and illustrates the relation between successive steps which constitute one complete cycle of operations.

The cam 75 referred to above, is mounted upon a horizontal shaft 78 which is driven by the speed reducing unit 39. This cam, as will be apparent presently, regulably controls the relative movements of the chuck 22 and the moil gripping unit 47. Specifically, the cam 75 (Figs. 1, 2, and 9) comprises a hub 79 which is keyed to the aforementioned shaft 78 and carries a radial plate 80, or flange, the peripheral portion of which is shaped to the contour necessary to impart the desired movements to the chuck and burner units 22 and 23 respectively. The steps constituting a complete cycle of operations are believed to be clearly indicated in Fig. 9. The shortest radius of the cam when uppermost functions to hold the chuck and burner lowered for the loading operation. Simultaneously with such positioning of the chuck and burner, the push rods 32 and 33 (Fig. 1) elevate the suction bottom plate 31 as indicated in Fig. 8, whereby to facilitate positioning of an article thereupon. This loading position is represented by the reference character A in Fig. 9. Immediately after the loading operation has been completed, that surface of the cam occupying zone B in Fig. 9, functions to raise the chuck and burner and so position the moil with respect to the jaws 48 that the latter may be contracted into firm holding relationship to the moil and article. Through opening of the valve 46 (Fig. 1) oxygen is admitted to the burner 23 for mixture with the gas, the flame resulting from such mixture being intensely hot and operating to soften the glass at the zone of intended severance thereof. It will be observed by reference to Fig. 9 that during treatment of the glass in the wall softening zone C, there is no relative movement whatsoever between the moil and article. After a predetermined degree of softening of the glass, the stretching zone D is reached. Here the periphery of the cam 75 has its radius shortened progressively to thereby effect a gradual stretching of the softened glass. In the latter portion of this zone D, the glass is severed and effects a complete separation of the moil and article. The beading zones E and F follow and involve lowering of the chuck and burner as a unit while the intensely hot flame continues to play upon the severed edge or lip of the article. Thus a uniform bead is provided upon this edge portion. Following this beading operation, the cam causes the chuck and burner to move downwardly a sufficient distance relative to the suction bottom plate 31 to again position said plate as shown in Fig. 8. This is referred to as the delivery zone G in Fig. 9. A pair of circumferentially adjustable cam segments 81 attached to the main cam plate 80, regulably control the length of the period of stretching, severing and beading operations.

Operation of the moil engaging jaws (Fig. 1) is controlled by the coil spring 62 and a pair of diametrically opposed cams 82 which engage one arm of the bell crank lever at regular time intervals. One cam is shown in engagement with the bell crank lever in Fig. 1 for the purpose of holding the spring 62 under tension and the jaws open preparatory to raising of the article to a position in which these jaws may grip the moil. The other cam 82 will similarly actuate the bell crank lever and compress the spring 62 preparatory to removal of the moil from the jaws and depositioning the same in the moil pan 83, or receiver, shown in Fig. 7.

Control of the flow of oxygen to the burner is obtained by means of a cam 84 which is mounted upon the shaft 78 with the other cams, said cam 84 being constantly engaged with a roller 85 carried by a spring pressed movable valve member 86.

Modifications may be resorted to within the spirit and scope of the appended claims.

I claim:

1. In apparatus of the character described, an article support adapted for engagement with the bottom of an article of glassware having a moil attached thereto, a burner positioned adjacent to one end of said support and surrounding the article at its point of juncture with the moil, a moil gripping unit positioned on that side of the burner opposite said support, the axes of the support, burner, and moil gripping unit being in vertical alignment with one another, a cam, mechanism actuated by the cam for holding the burner and support against axial movement relative to said moil gripping unit during the application of a glass softening flame to the article, and also operable by said cam following the softening operation for effecting relative movement between the moil gripping unit and support to thereby effect separation of the article and moil axially and thereby stretch and finally sever the glass in the softened area, a second cam, and means actuated by said second cam for operating the moil gripping unit and thereby releasing the severed moil from said unit.

2. In apparatus of the character described, a slide mounted for vertical reciprocation, a pair of superposed horizontal brackets mounted upon one side of the slide, a rotary upwardly opening chuck mounted upon the lower bracket, a ring type burner mounted upon the upper bracket in axial alignment with and in fixed relation to said chuck, moil gripping jaws positioned above the burner, suction means for securely holding an article with a moil thereon in said chuck, means for supplying a combustible fuel to said burner, means for closing the jaws about the moil, a cam and mechanism actuated by the cam for moving the slide upward and then holding said chuck, burner and jaws against relative movement during a period in which the glass at the juncture of the article and moil is softened by the burner, said mechanism also operable by the cam for then moving the slide downwardly relative to the moil gripping jaws to thereby lower the article and stretch and sever the softened glass.

3. In apparatus of the character described, a slide mounted for vertical reciprocation, a pair of superposed horizontal brackets mounted upon one side of the slide, a rotary upwardly opening chuck mounted upon the lower bracket, a ring type burner mounted upon the upper bracket in axial alignment with and in fixed relation to said chuck, moil gripping jaws positioned above the burner, suction means for securely holding an article with a moil thereon in said chuck, means for supplying a combustible fuel to said burner, means for causing the jaws to firmly grip and release the moil, a rotary cam, mechanism operatively connecting the cam and slide for moving the slide upward and holding the burner, and chuck against movement relative to the jaws for a predetermined period of time and then lowering the burner and chuck a predetermined distance relative to said jaws to thereby stretch and sever the glass at the juncture of the article and moil, means for diminishing the intensity of the heat applied to the glass by said burner, means for elevating the article relative to the chuck preparatory to removal of said article, said mechanism including a rack bar attached to the slide and extending longitudinally thereof, a second rack bar mounted for vertical sliding movement substantially directly above the axis of rotation of said cam, a train of gears operatively connecting the rack bars, and means for effecting operative connection between the lower end of the second rack bar and said cam.

4. In apparatus of the character described, a slide mounted for vertical reciprocation, a pair of superposed horizontal brackets mounted upon one side of the slide, a rotary upwardly opening chuck mounted upon the lower bracket, a ring type burner mounted upon the upper bracket in axial alignment with and in fixed relation to said chuck, moil gripping jaws positioned above the burner, suction means for securely holding an article with a moil thereon in said chuck, means for supplying a combustible fuel to said burner, means for causing the jaws to firmly grip and release the moil, a rotary cam, mechanism operatively connecting the cam and slide for moving the slide upward and holding the burner, and chuck against movement relative to the jaws for a predetermined period of time and then lowering the burner and chuck a predetermined distance relative to said jaws to thereby stretch and sever the glass at the juncture of the article and moil, means for diminishing the intensity of the heat applied to the glass by said burner, means for elevating the article relative to the chuck preparatory to removal of said article, said mechanism including a rack bar attached to the slide and extending longitudinally thereof, a second rack bar mounted for vertical sliding movement substantially directly above the axis of rotation of said cam, a train of gears operatively connecting the rack bars, an arm pivoted for vertical swinging movement and positioned with its free end in contact with the lower end of the second named rack bar and a roller at said free end riding upon the periphery of the cam.

5. In apparatus of the character described, a slide mounted for vertical reciprocation, a pair of superposed horizontal brackets mounted upon one side of the slide, a rotary upwardly opening chuck mounted upon the lower bracket, a ring type burner mounted upon the upper bracket in axial alignment with and in fixed relation to said chuck, moil gripping jaws positioned above the burner, suction means for securely holding an article with a moil thereon in said chuck, means for supplying a combustible fuel to said burner, means for causing the jaws to firmly grip and release the moil, a rotary cam, mechanism operatively connecting the cam and slide for moving the slide upward and holding the burner, and chuck against movement relative to the jaws for a predetermined period of time and then lowering the burner and chuck a predetermined distance relative to said jaws to thereby stretch and sever the glass at the juncture of the article and moil, means for diminishing the intensity of the heat applied to the glass by said burner, means for elevating the article relative to the chuck preparatory to removal of said article, said mechanism including a rack bar attached to the slide and extending longitudinally thereof, a second rack bar mounted for vertical sliding movement substantially directly above the axis of rotation of said cam, a train of gears operatively connecting the rack bars, means for effecting operative connection between the lower end of the second rack bar and said cam, and means including a rotary screw for adjusting the first named rack bar longitudinally of the slide to thereby compensate for variations in the height of the articles of glassware being treated.

6. In apparatus of the character described, an article support adapted for engagement with the bottom of an article of glassware having a moil attached thereto, a burner positioned adjacent to one end of said support and surrounding the article at its point of juncture with the moil, a moil gripping unit positioned on that side of the burner opposite said support, the axes of the support, burner, and moil gripping unit being in vertical alignment with one another, a cam, mechanism actuated by the cam for holding the burner and support against axial movement relative to said moil gripping unit during the application of a glass softening flame to the article and also operable by said cam following the softening operation for effecting relative movement between the moil gripping unit and support to thereby effect separation of the article and moil axially and thereby stretch and finally sever the glass in the softened area, a second cam, and means actuated by said second cam for operating the moil gripping unit and thereby releasing the severed moil from said unit, the cam for operating said moil gripping unit being coaxial with the first named cam.

7. In apparatus of the character described, an article support adapted for engagement with the bottom of an article of glassware having a moil attached thereto, a burner positioned adjacent to one end of said support and surrounding the article at its point of juncture with the moil, a moil gripping unit positioned on that side of the burner opposite said support, the axes of the support, burner, and moil gripping unit being in vertical alignment with one another, a cam, mechanism actuated by the cam for holding the burner and support against axial movement relative to said moil gripping unit during the application of a glass softening flame to the article and also operable by said cam following the softening operation for effecting relative movement between the moil gripping unit and support to thereby effect separation of the article and moil axially and thereby stretch and finally sever the glass in the softened area, a second cam, means actuated by said second cam for operating the moil gripping unit and thereby releasing the severed moil from said unit, and means for rotating both cams continuously.

CARL W. SCHREIBER.